United States Patent [19]

Einvall

[11] Patent Number: 5,762,344

[45] Date of Patent: Jun. 9, 1998

[54] HANDLE FOR A FILE HAVING POLYGONAL CROSS SECTION

[75] Inventor: Joacim Einvall, Povoa de Varzim, Portugal

[73] Assignee: Sandvik AB, Sandviken, Sweden

[21] Appl. No.: 760,265

[22] Filed: Dec. 5, 1996

[30] Foreign Application Priority Data

Dec. 7, 1995 [SE] Sweden ................... 9504373

[51] Int. Cl.⁶ .................... B23D 71/04; B25G 3/10
[52] U.S. Cl. .................. 279/96; 279/102; 407/29.15; 16/114 R; 81/489; 30/340; 403/361
[58] Field of Search ................. 279/95, 96, 102, 279/9.1; 407/29.15; 16/114 R; 403/361, 383; 30/340; 81/489, 77.1

[56] References Cited

U.S. PATENT DOCUMENTS

| 281,626 | 7/1883 | French | 81/489 |
| 2,809,846 | 10/1957 | Whiteford | 407/29.15 |
| 2,977,668 | 4/1961 | Maness | 407/29.15 |
| 4,327,465 | 5/1982 | Moritsch | 407/29.15 |

*Primary Examiner*—Steven C. Bishop
*Attorney, Agent, or Firm*—Burns, Doane, Swecker & Mathis, L.L.P.

[57] ABSTRACT

A file of polygonal cross section is secured frictionally in a hole of a handle. The hole has as many corners as the file, and a surface extends between adjacent pairs of the corners of the hole. Each of those surfaces includes a concave segment and a convex segment. The concave segment is shaped such that relative rotation between the handle and file causes the corners of the file to tightly engage the concave segments to secure the file within the handle.

15 Claims, 1 Drawing Sheet

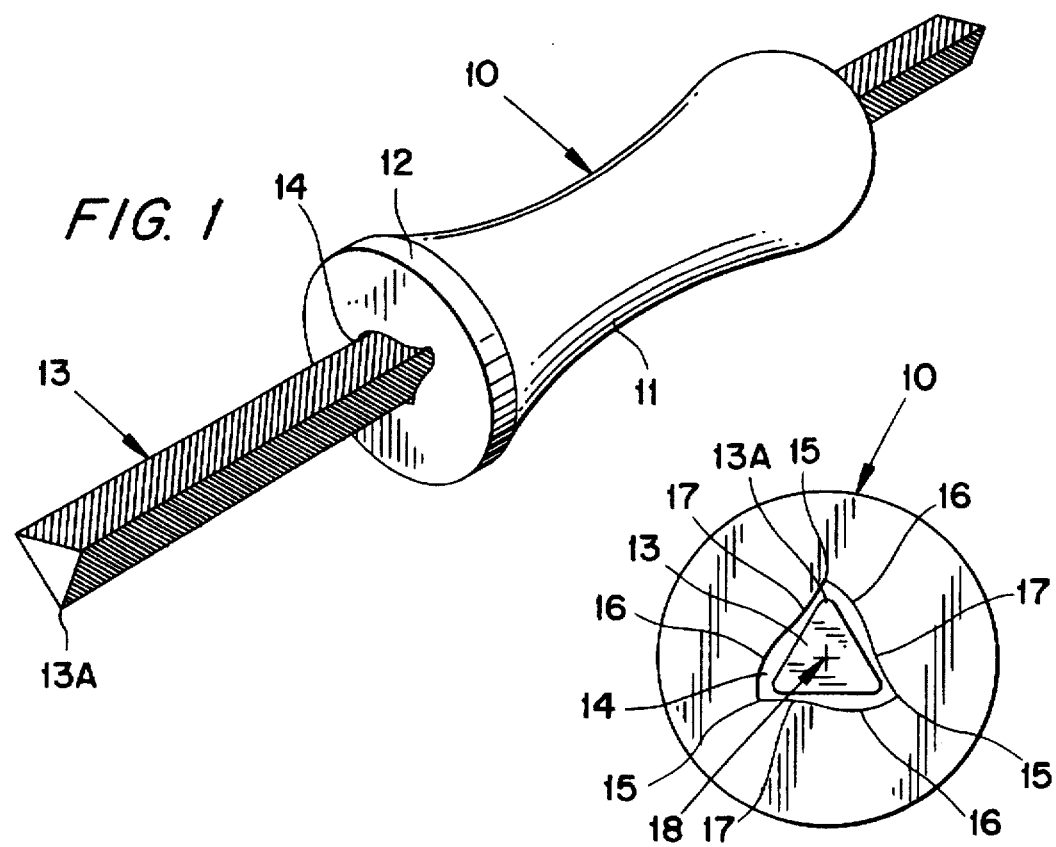
FIG. 1
FIG. 2A
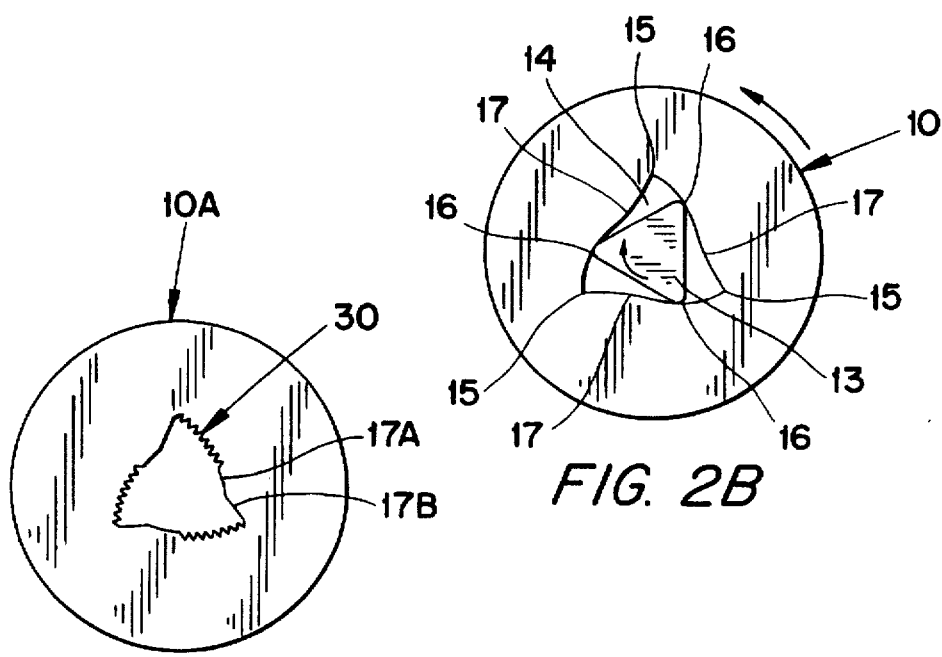
FIG. 3
FIG. 2B

1

HANDLE FOR A FILE HAVING POLYGONAL CROSS SECTION

BACKGROUND OF THE INVENTION

The present invention relates to tool-sharpening files and, in particular, to a handle attached to such a file.

Files for sharpening cutting tools are provided with handles in order not to wear or overstrain the hand of the user. The handle is usually made with a hole in one end and is attached to the file by pressing the file onto a smooth tapering tang of the file, which deforms and wedges against the walls of the hole. The handle is often also made to keep the hand from touching the edge of the tool being sharpened.

Certain types of files, such as small needle files, are made with a cylindrical non-tapering tang and held to a handle by means of movable jaws of the handle which grip the tang like a drill chuck. Similar handles are also used for chain saw files, but none of those handles have through holes.

For sharpening of scythes, sickles, brush knives and machetes, heavy files are used which have a polygonal, usually triangular or square, cross section. It would be desirable to provide a handle to be used for such heavy files, allowing the file to be made without a smooth tang, and making it possible to have only a limited portion of the heavy file active at a time.

SUMMARY OF THE INVENTION

The present invention relates to a handle for a file of polygonal cross section. The handle has a non-circular hole therein (preferably a through-hole) for receiving the file. The hole forms at least three corners, with surfaces extending between each adjacent pair of the corners. Each of the surfaces includes a generally concave segment and a generally convex segment. The generally concave segment includes a long-radius end and a short-radius end. The long-radius end is spaced farther from an axis of the hole than is the short radius end.

The invention also relates to the handle in combination with a file, whereby the file is secured within the handle by frictional contact of the file corners with the generally concave segments of the handle hole in response to relative rotation between the handle and the file.

BRIEF DESCRIPTION OF THE DRAWING

Preferred embodiments of the invention will be described in detail with reference to the appended drawings in which:

FIG. 1 is a perspective view of a conventional file secured within a handle according to the present invention;

FIG. 2A is an axial end view of the file and handle before the file has been secured therein;

FIG. 2B is a view similar to FIG. 2A after the handle has been secured to the file; and FIG. 3 is a view similar to FIG. 2B of a modified handle.

DETAILED DESCRIPTION OF PREFERRED EMBODIMENTS OF THE INVENTION

A handle (10) is made from a synthetic polymer in one piece, and comprises a gripping part (11) having a shape and a surface structure suited for stable gripping by the user's hand. At its front end, the handle is flared to form a finger protector (12) hindering the hand from sliding forward towards the sharp edge of a tool being sharpened.

The conventional file (13) has a polygonal cross section and no longitudinal taper (i.e., no taper at least over a major part of its length). Thus, the file forms at least three corners (13A). The file cutting is performed such that the cutting edge is sharpened by pushing the file forward. The file teeth are pointing from the mid-section towards a respective end, so the file is reversible in the handle. The teeth are at such an angle that filing can also be done by moving the file sideways.

The file is inserted coaxially in a through hole (14) which extends through the whole length of the handle, and is open at both ends. In case only a short portion of the file is to be utilized, the excess length of the file can extend from the rear opening. The hole has such a cross-section that the file can be easily inserted, and subsequently locked in place by rotating the handle relative to the file. The hole (14) has as many outward corners (15) as the file (13), but the corners (15) are at a slightly greater distance from the file axis (18). Thus, the corners (15) of the hole are spaced just slightly outwardly from the respective corners (13A) of the file.

Between adjacent pairs of the corners, the surface of the hole comprises one concave segment (16) and one convex segment (17). The concave segment (16) should be shaped such that a radial distance from the center axis (18) of the handle is greatest at the respective outward corner (15), and smallest where the concave segment meets the convex segment. That is, the concave segment (16) of the hole (14) is not equidistant from the axis (18); rather, that segment (16) is spiral shaped with a constant angle relative to a radius from the axis (18). Accordingly, a radius of a longest-radius end of the concave segment, i.e., the end located at the corner (15), is longer than a radius of a shortest-radius end of the concave segment, i.e., the end located at the junction between segments (16) and (17) and is longer than a maximum radius of the file defined by a distance between the center axis of the file and each of the corners (13A) of the file. When the handle is rotated counter-clockwise relative to the file, a condition will be reached where all file corners (13A) are pressed against the concave segment (16) of the hole so hard that the file is rigidly held by the resulting friction and/or deformation forces (see FIG. 2B).

The concave segment (16) could also be structured with narrow grooves (30) or other friction enhancing patterns, as shown in connection with a modified handle 10A depicted in FIG. 3.

The file can be easily loosened from the handle by a reverse rotation.

It will be appreciated that the shape of the convex segment (17) is not critical, since that segment merely must function as a transition from a short-radius end of one concave segment (16) to a long-radius end of an adjacent concave segment (16). Thus, the convex segment could be of many various shapes, such as a pair of flat faces 40, 42 as shown in connection with the modified handle 10A of FIG. 3.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. A handle for a file of polygonal cross-section, the handle having a non-circular hole therein for receiving the file, the hole forming at least three corners, with surfaces extending between each adjacent pair of the corners, each of the surfaces including a generally concave segment and a generally convex segment, the generally concave segment including a long-radius end and a short-radius end, the long-radius end being spaced farther from a center axis of the hole than is the short-radius end.

2. The handle according to claim 1, wherein the generally convex segment connects a short-radius end of one of the generally concave segments with a long-radius end of an adjacent one of the generally concave segments.

3. The holder according to claim 1, wherein each of the generally concave and convex segments are curved.

4. The holder according to claim 1, wherein the convex segment includes at least one straight portion.

5. The holder according to claim 1, wherein each of the generally concave surfaces is of spiral shape with reference to the center axis.

6. The holder according to claim 1, wherein the number of the corners is three.

7. The holder according to claim 1, wherein the hole extends completely through the handle.

8. In combination, a file of polygonal cross section having at least three corners, and a handle in which the file is secured, a distance from an axis of the file to each corner defining a maximum file radius, the handle having a non-circular hole therein receiving the file coaxially, the hole forming the same number of corners as the file, with surfaces extending between each adjacent pair of the corners, each of the surfaces including a generally concave segment having a long-radius end and a short-radius end, the long-radius end being spaced from an axis of the hole by a first distance, and the short-radius end being spaced from the axis of the hole by a second distance, the first distance being greater than the second distance and greater than the maximum radius of the file, the second distance being less than the maximum radius of the file, so that the file is secured within the handle by frictional contact of the file corners with the generally concave segments in response to rotation of the handle relative to the file in one direction of rotation.

9. The combination according to claim 8, wherein each of the surfaces further includes a generally convex segment connecting the short-radius end of one of the generally concave segments with a long-radius end of an adjacent one of the generally concave segments.

10. The combination according to claim 9, wherein each of the convex segments is curved.

11. The combination according to claim 9, wherein each of the convex segments includes at least one straight portion.

12. The combination according to claim 8, wherein each of the generally concave surfaces is of spiral shape with reference to the axis.

13. The combination according to claim 8, wherein the number of the corners is three.

14. The combination according to claim 8, wherein the file is longitudinally non-tapering.

15. The combination according to claim 8, wherein the hole extends completely through the handle and the file is longer than the hole.

* * * * *